(12) United States Patent
Steiner

(10) Patent No.: US 6,421,148 B2
(45) Date of Patent: Jul. 16, 2002

(54) VOLUME HOLOGRAPHIC DIFFUSERS

(75) Inventor: Ivan B. Steiner, Ridgewood, NJ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/741,559

(22) Filed: Dec. 20, 2000

Related U.S. Application Data

(60) Provisional application No. 60/175,001, filed on Jan. 7, 2000.

(51) Int. Cl.$^7$ ................................ G02B 5/32
(52) U.S. Cl. ..................... 359/15; 359/13; 349/112
(58) Field of Search .................... 359/13, 14, 15; 349/112

(56) References Cited

U.S. PATENT DOCUMENTS 5,280,371 A    1/1994  McCartney, Jr. et al.
5,521,724 A  * 5/1996  Shires .......................... 359/15
5,850,300 A  * 12/1998 Kathman et al. ............. 359/15

FOREIGN PATENT DOCUMENTS

EP    0 479 490 A2    4/1992
EP    0 653 651 A     5/1995
GB    2 306 229 A     4/1997

* cited by examiner

*Primary Examiner*—Darren Schuberg
(74) *Attorney, Agent, or Firm*—Loria B. Yeadon

(57) ABSTRACT

A collimated or partially collimated light beam is sent through a substrate matrix of a plurality of nested individual joined geometrically shaped cells wherein each of the cells contains a patterned volume holographic diffuser which produces a transmitted diffused light beam from each of the cells and then superimposes each transmitted diffused light beams from each of the cells to produce a combined resultant diffused light beam. The geometrically shaped cells are clustered in a contiguous arrangement of nested cell subgroups, which are themselves geometrically shaped. When graphed, an angular luminance distribution profile curve with sharply vertical profile slopes at halfpeak points and with a substantially flat and wide peak is resultant which produces a uniform resultant luminance over a wide range of view with a predetermined beam spread and beam deflection angle in relation to a predetermined location of view of the combined resultant diffused light beam.

20 Claims, 10 Drawing Sheets

VOLUME HOLOGRAPHIC DIFFUSERS

RELATED PATENTS AND APPLICATIONS

This application is based upon, and claims priority benefits of, U.S. Provisional Application No. 60/175,001, filed Jan. 7, 2000.

FIELD OF THE INVENTION

This invention relates generally to volume holographic diffusers.

BACKGROUND OF THE INVENTION

Holographic diffusers are well known in the art. Additionally, LCD displays, which make use of holographic diffusers, are also well known in the art. Typically, an LCD display uses a holographic diffuser either to augment the back lighting of the LCD display or to direct the transmitted display light to an observer located within a particular range of viewing angles. To accomplish this the holographic diffuser directs the diffused light in particular paths of propagation designed to fill a specific range of viewing angles.

For example, if an aircraft cockpit display has a holographic diffuser, the head box of the pilot will be the area that could be occupied by the pilot's eyes from which the pilot can be expected to view the output of the display. Therefore it is advantageous to design the holographic diffuser to direct the light transmitted by the LCD display to the head box of the pilot. Thus, it is known to redirect light using holographic diffusers.

However, it is difficult to maintain uniform luminance over the desired range of viewing angles and to produce a sharp luminance fall-off at the edges of the viewing angle range. This difficulty exists because each holographic diffuser design causes display luminance to be a variable function of viewing angle. As a result, display luminance can vary detrimentally when viewed from within the pilot's head box and the luminance cut-off at the fringes of view lacks sharpness. This is generally attributable to two undesirable properties of known holographic diffusers. Firstly, as the light's angle of incidence on a holographic diffuser approaches the limits of acceptable angles of incidence consistent with its design, the hologram's diffusion properties begin to break down and the incident light begins to transmit through the hologram without becoming diffused or deviated in propagation angle. Secondly, the corresponding plot of display luminance as a function of viewing angle resembles a bell-shaped curve. This causes the viewed display images to become dim as viewing angles approach the edges of the viewing angle range. Further, considerable wasted light falls outside the useful range of viewing angles owing to lack of sharpness in luminance fall-off at the fringes of the viewing angle range of interest.

FIG. 1 is a side view of a conventional diffusion screen arrangement in the art. With reference to FIG. 1, a collimated, or partially collimated, white light input beam 10 illuminates a refractive medium substrate 12 and a volume holographic film diffuser 13 at normal incidence. The holographic film 13 diffuses the projected output beam 14 over angular range λ. The angle λ shown in FIG. 2 is the halfpeak full width angle of the luminance angular distribution profile between halfpeaks 20. Little, or no, color dispersion is noticeable.

Referring to FIG. 1A, it is noteworthy that when a collimated, or partially collimated, white light input beam 10 is incident on refractive medium substrate 12 at an angle φ greater or less than 90°, the beam exiting the volume hologram can be designed to maintain the same (or nearly the same) diffusion angle, λ, as that for normal incidence. Alternatively, referring to FIG. 1B, with normal incidence of collimated, or partially collimated, white light input, an output beam with a diffusion angle, λ, can be projected in a direction that is not normal to the substrate. This can improve the luminance of an aircraft cockpit instrument display located below the pilot eye level, and with the instrument display face normal at a considerable (20° to 30° or more) angle to the pilot's direct view line. This can be accomplished by projecting the diffused output beam away from the instrument face normal and toward the center of the pilot's head box.

Also, designs of volume holographic diffusers are possible in which the input white light collimated, or partially collimated, beam and the propagation direction of the diffused output beam both deviate from the substrate (or instrument display face) normal.

In these prior art diffuser designs, the gradual luminance fall-off at the fringes of the viewing angle range (and at angles beyond those fringes) causes a waste of light resulting in reduced display luminance. Therefore, to minimize wasted light and maximize the light flux captured within the viewing angle range of interest, it is advantageous to maximize the slope at the halfpeak points of the luminance angular distribution curve.

SUMMARY OF THE INVENTION

This invention is particularly useful as a beam deflecting diffusion screen for displays, such as LCD instrument panel modules in aircraft cockpits and heads-up displays although its application is not limited to displays. A set of narrow superimposed deflected diffused beam profiles with sharp luminance cut-offs at their halfpeak full width points forms a composite angular luminance distribution. By concentrating these superimposed light beams that project from a display panel and by capturing them within the pilot's head box, efficiency is improved by minimizing the light wasted by projection outside the pilot's head box. Although an individual projected narrow beam angular profile does not, by itself, render the display luminance uniform as a function of viewing angle, the superposition of a plurality of individual narrow beams can be designed to generate uniform luminance over a wide viewing angle range of interest.

The invention is accomplished with the structure and method of the present invention by sending collimated, or partially collimated, light through a substrate with a film matrix comprising a nested plurality of individual joined geometrically shaped holographic cells. The cells comprising the matrix are subdivided into groups. Each cell within a group contains a uniquely patterned volume holographic diffuser. This generates a diffused narrow light beam projected in a direction diverse from that projected by every other cell in the group. The superposition of the variously directed diffused narrow light beams projected from each cell group produces a combined resultant diffused wide light beam. The resultant light beam has a luminance angular distribution profile with sharply vertical slopes at its halfpeak points and a substantially flat and wide peak over a wide viewing angle range of interest. The display luminance thus produced is uniform over a wide range of viewing angles. This range of angles is centered on a specific beam deflection angle that passes through the midpoint of the pilot's head box. Thus the matrix of cells on the display produces a uniform luminance over the entire surface of that display and when viewed from any point within the pilot's head box. The resulting display luminance is substantially uniform over a wider range of viewing angles than is known in the art and the sharpness of the luminance fall-off at the angular distribution profile halfpeak points is greater than is known in the art. In the preferred embodiment, a non-alternating, single image is also provided for both eyes rather than alternating a separate right eye image with a separate left eye image.

This invention is most useful for applications where collimated, or partially collimated, light is incident on a display and a need exists to project the light transmitted by the display into a wider and more diffuse beam. A further enhancement of its usefulness occurs when the projected diffuse beam is uniformly distributed over a desired wide range of viewing angles and with sharp luminance cutoffs at the edges of that range. The projected diffuse beam can also have an asymmetric (i.e. different angular widths in orthogonal profile planes) output beam envelope, which has a high efficiency and little or no color dispersion. It may also be desired to have the option of deflecting the axis of this output beam envelope at a different angle from the input beam direction. An asymmetric output beam envelope and/or one having an axis different from that of the input beam is useful for minimizing light flux that fails to fall within a pilot head box having asymmetric dimensions and/or one that is positioned away from the display normal.

By creating a matrix of volume holographic cells arranged in a regular pattern on or within the surface of the diffusion screen, the adjacent cells of a subgroup of the matrix have different holographic designs each of which deflects the diffused beam projected therefrom in a different direction. The beam spread and deflection direction of each projected output beam can be controlled by means of each different subgroup cell holographic design. The superposition of diffused projected output beams thus produced generates a composite angular luminance distribution with sharp profile slopes at its halfpeak points and a substantially flat wide peak. The composite projected beam has the desired diffusion spread and propagation direction.

Thus, the present invention uses a method and apparatus for sending light beams from a display through a substrate matrix of nested individually joined geometrically shaped cells. The cells are divided into subgroups wherein each cell of a subgroup contains a patterned volume holographic diffuser with a different design or projection angle for optimal diffusion to occur. Each cell of a subgroup projects a diffused light beam with a different angle of propagation from that of the other cells of the subgroup.

Owing to the holographic diffuser's repetitive pattern of cell subgroups, there are many more cells than beam projection directions. Therefore each cell has a beam projection direction shared with many other cells in the matrix. The angular distribution of light incident on a holographic diffuser cell can be widened by the cell's diffusion properties. Thus the angular distribution of the beam projected from that cell can be wider than that of the incident light beam. Further, the beam projected from that cell can propagate in directions diverse from that of other cells of its cell subgroup. Therefore the angular distribution of the composite beam projected from a subgroup of cells can be wider and, possibly more angularly asymmetric, than any of the individual component beams comprising the composite beam. Further, because the composite beam can be comprised of a plurality of individual beams having narrow angular distributions (compared with the composite beam's distribution), the annular distribution profile slope at the composite beam's halfpeak points can be sharp and nearly vertical, similar to that of the narrow beams. When the display is viewed from points in the pilot's head box, display luminance can be a uniform function of viewing angle because the peak composite projected beam's angular distribution is substantially flat over a wide range of viewing angles. Thus a predetermined beam spread and deflection angle is created in relation to the viewer. Photometric efficiency is maximized by virtue of high, nearly vertical, slope angles produced at the fringes of the luminance angular distribution profiles projected from cell subgroups across the display surface.

DETAILED DESCRIPTION

Figure 3:
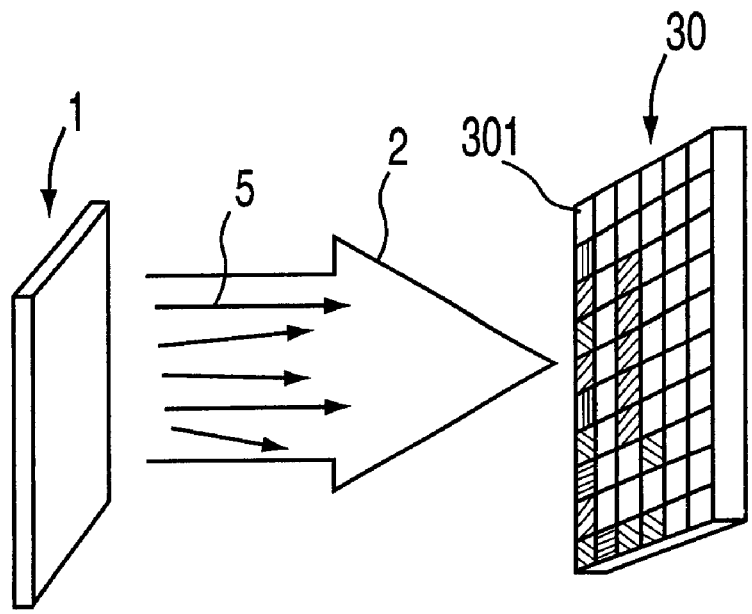
FIG. 3 is a perspective view of the input side of the holographic diffuser of the present invention.
Figure 4:
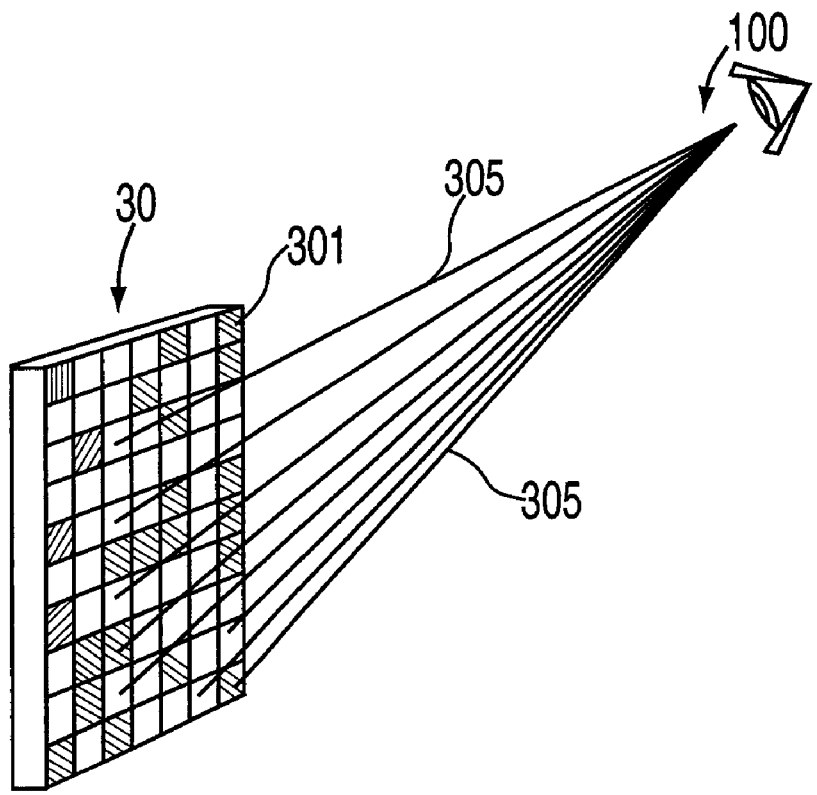
FIG. 4 is a perspective view of the output side of the holographic diffuser of the present invention.

FIGS. 3 and 4 show a holographic diffuser 30 in accordance with present invention. Referring to FIG. 3, the holographic diffuser 30 is made up of nested individual joined geometrically shaped cells that form a matrix of cells disposed across holographic diffuser 30. These cells are clustered in a contiguous arrangement of nested cell subgroups 301 that together form the patterned holographic diffuser 30. Each individual joined geometrically shaped cell of cell subgroup 301 comprises an individual patterned holographic diffuser element. Each holographic diffuser element of a cell subgroup diffuses the input light and projects the diffused beam in a direction unique from that projected by the other diffuser elements of its cell subgroup. A display 1, which may be typically a backlit LCD display is shown in FIG. 3. Incident light 2 comprised of light rays 5 having various directions of propagation from the display 1 are incident upon holographic diffuser 30.

It is noted that the distance between display 1 and holographic diffuser 30 is not drawn to scale, and in practice the closer the display is to the diffuser, the easier it is to produce a clear image without resolution loss. Therefore, it is preferred that holographic diffuser 30 be laminated or attached to display 1.

In order to prevent resolution loss by the holographic view screen 30, the size of the subgroup 301 of holographic cells must be smaller than a display pixel. As a rule of thumb, a subgroup dimension should not exceed half the corresponding pixel dimension. Thus the area of the subgroup should not exceed ¼ the area of a display pixel.

Further, those skilled in the art will realize that edge effects at the boundary between adjacent holographic cells may prevent the desirable abrupt "step function" change of holographic properties in the transition region between cells. Therefore, a loss of holographic performance occurs in the boundary area between two cells. This loss is more pronounced for smaller holographic cells owing to the greater percentage of the cell area occupied by the transition region between smaller cells. Accordingly, the area of the holographic cells comprising a subgroup 301 should be made no smaller than required to prevent resolution loss.

Figure 8:
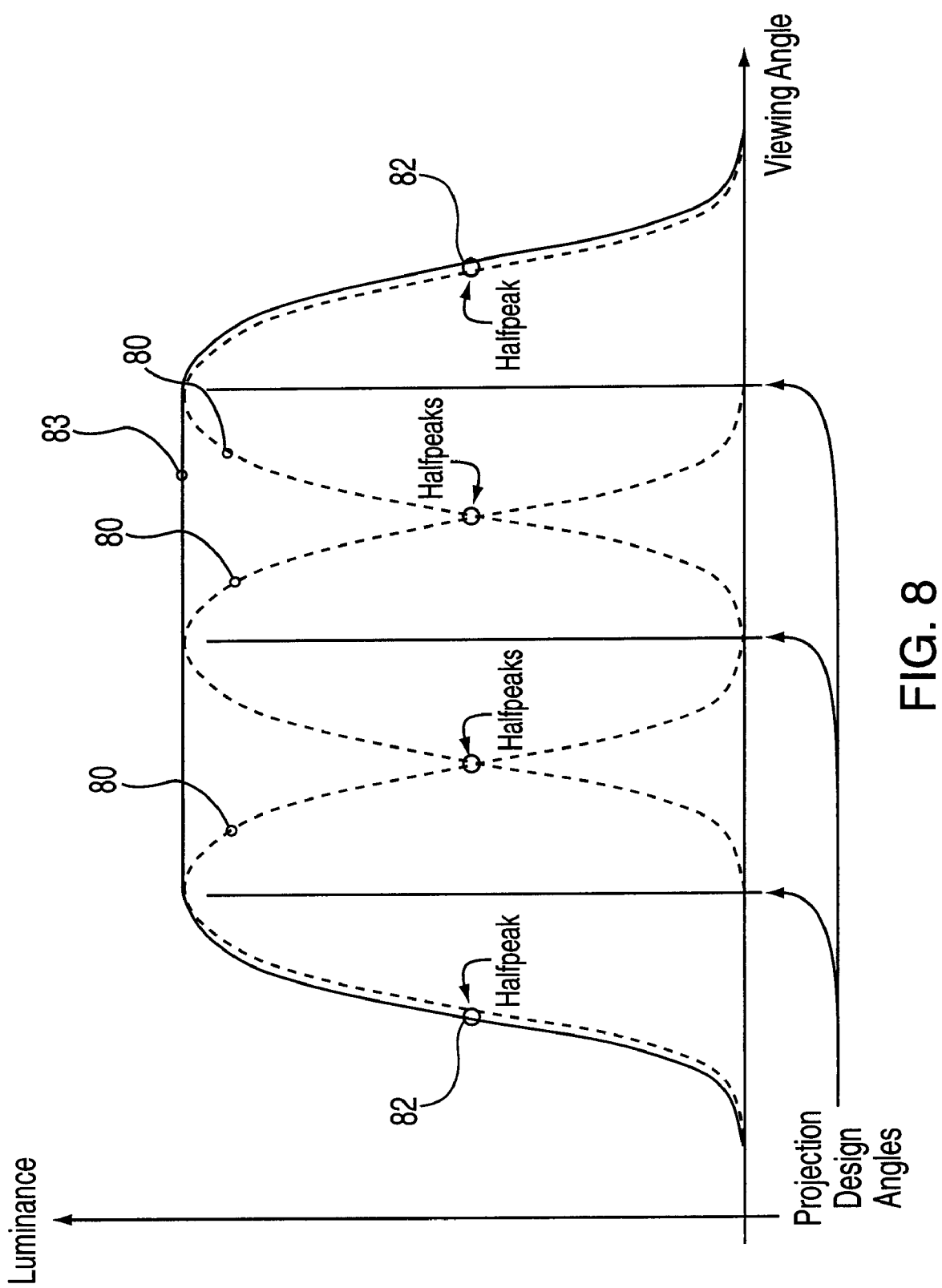
FIG. 8 is a graph in Cartesian coordinates of resultant luminance versus projection angle for three superimposed diffusion profiles of the present invention when partially collimated light is input to a holographic diffuser.

In FIG. 3, partially collimated light 2 incident on holographic diffuser 30 passes through its multiple cell structure. Each individual nested holographic element of this structure diffuses the light it intercepts and projects it toward some portion of the pilot's head box. Each cell comprising a cell subgroup 301 projects its diffuse beam in a direction diverse from the other cells of that subgroup. The superposition of all these diversely projected beams form a composite beam that can be viewed from all points within the pilot's head box. The luminance versus viewing angle plot of FIG. 8 is an example of the luminance of a subgroup of cells as a function of viewing angle for observation points within the pilot's head box. Note that FIG. 8 is a profile plot taken through a three-dimensional plot representing two orthogonal angular dimensions (representing directions of light flux propagation passing through the area of the pilot's head box) and the luminance dimension. Accordingly, there could be a three-by-three array of diffused beams projected at different projection design angles from a subgroup of nine holographic cells. The plot of FIG. 8 could be a profile slice taken through three of the nine projected beams. The three dashed line plots 80 of FIG. 8 represent luminance angular profiles of individual projected beams, each centered on its unique projection design angle. The solid line 83 represents the composite sum of the individual projected beam luminance angular distributions 80.

Note that each beam plot crosses the adjacent beam plot at the common half peak point of both beams. This condition, necessary to produce a uniform luminance function of viewing angle, is implemented by selecting the angular separation of projection design angles of the individual beams to be equal to the angular separation of their half peak points.

Figure 9:
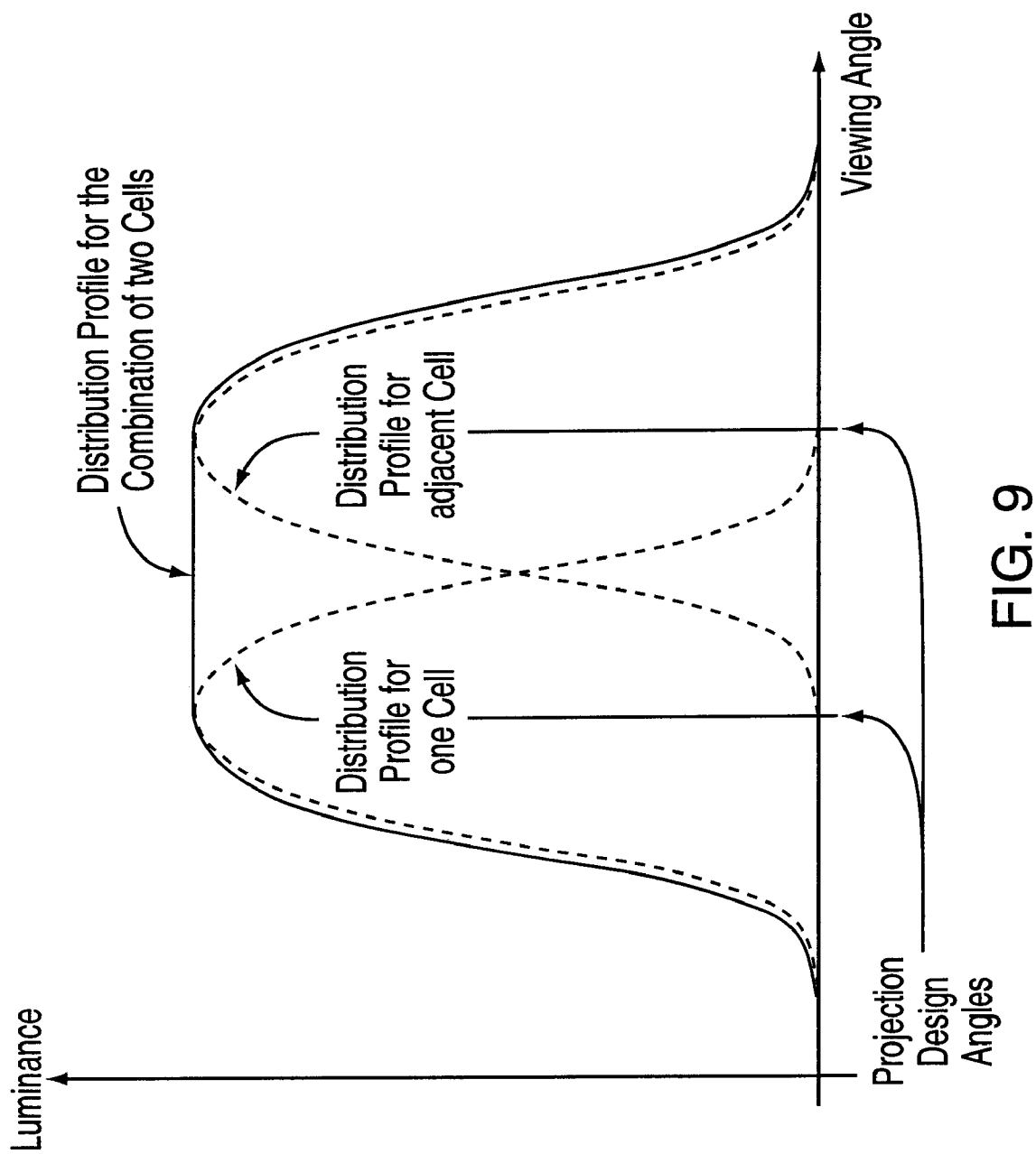
FIG. 9 is a graph in Cartesian coordinates of resultant luminance versus projection angle for two superimposed diffusion profiles of the present invention when partially collimated is input to a holographic diffuser.

The profile plot of a three-by-three arrangement of diffused beams illustrated by FIG. 8 is one of many possible arrangements. FIG. 9 is an example of a profile plot through the center of a pair of projected beams that could be in a one-by-two, a two-by-two, a three-by-two, or any N-by-two arrangement of beams projected from a holographic diffuser's cell subgroup 301. Of course, there are also many other possible arrangements, such as three-by-four, three-by-five, four-by-four, or in general, N-by-M, where the N and M variables could be any integer value within reason.

A portion of the diffused beams 305 meet at a location 100 (shown in FIG. 4 as the eye location of the viewer) which is within a designated spatial region such as a pilot's head box. These portions of diffused beams are individual viewing angles from the eye location 100 to each of a plurality of cell subgroups 301 on the holographic diffuser 30. At location 100, the diffused beam portions projected along viewing angles 305 are superimposed.

The superimposed beam portions are shown graphically as an output angular distribution profile curve in FIG. 8 by curves 80 that, added together, form the desired curve 83. By virtue of the uniform luminance over the wide range of viewing angles in FIG. 8, the display luminance for viewing angles 305, which are within that uniform luminance angular range, is also uniform. Accordingly, the luminance of the display is optimized at viewing location 100. Additionally, the wasted light outside the viewing angle region of interest of a traditional holographic diffuser is overcome by curve 83, which has a nearly vertical slope at halfpeak points 82.

Figure 2:
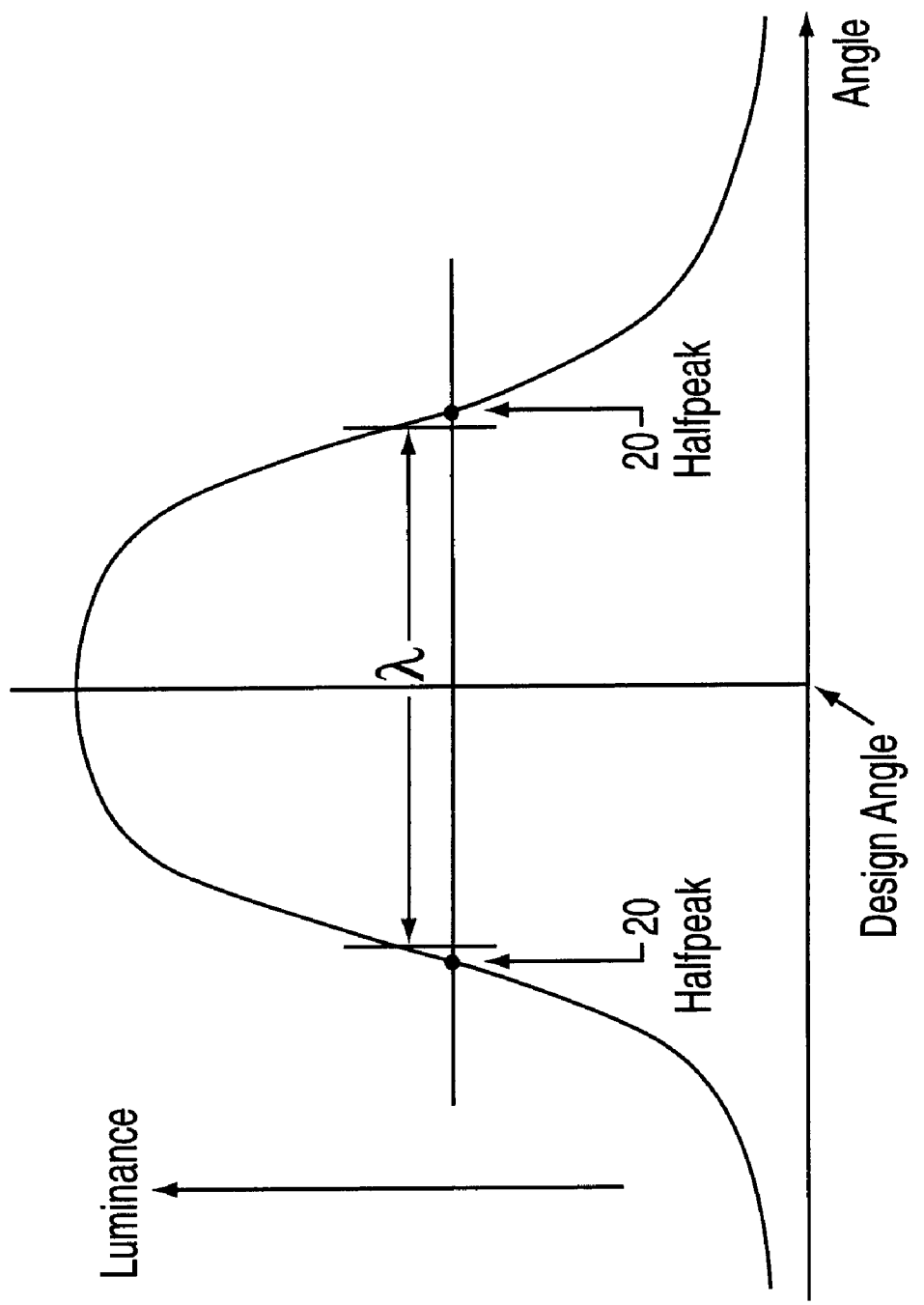
FIG. 2 is a profile plot in Cartesian coordinates showing the prior art bell curve function of luminance verses viewing angle for a specific projection angle.

This improvement is illustrated by comparing FIG. 8 with FIG. 2. In the present invention, it is readily seen from FIG. 8 that the luminance in the vicinity of the halfpeak points increases or decreases in a very sharp fashion. This is in contrast to the prior art FIG. 2 wherein the luminance is more of a bell curve shaped function having a relatively small angular region of uniform luminance and a more gradual variation of luminance in the angular vicinity of the halfpeak points. The resulting wasted light flux is undesirable in a display because it reduces the angular viewing range of adequate luminance. This phenomenon is generally referred to in the art as "the low slope problem at the halfpeak point".

Figure 5:
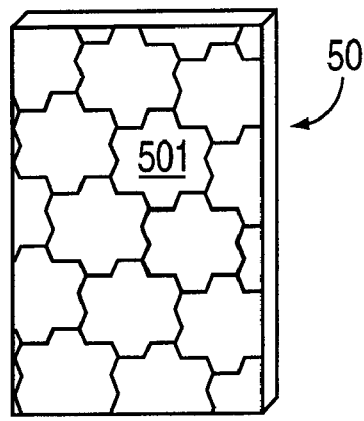
FIG. 5 is a perspective view of the holographic diffuser of the present invention wherein 18 sided cell subgroup shapes are used.
Figure 6:
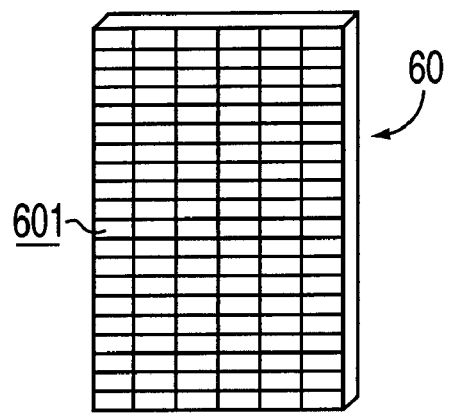
FIG. 6 is perspective view of the holographic diffuser of the present invention wherein rectangular holographic cell subgroup shapes are used.
Figure 7:
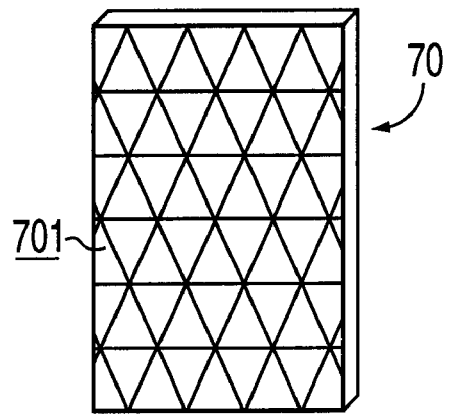
FIG. 7 is perspective view of the holographic diffuser of the present invention wherein triangular holographic cell subgroup shapes are used.

Referring again to FIGS. 3 and 4, the adjacent nested holographic cell subgroups 301 can be implemented in an endless variety of nested geometric shapes. Three examples of these are illustrated in FIGS. 5, 6, and 7. FIG. 5 illustrates a holographic diffuser 50 comprised of a nested matrix of 18-sided polygonal cell subgroups 501. FIG. 6 illustrates a holographic diffuser 60 comprising a nested matrix of rectangular cell subgroups 601. FIG. 7 illustrates a holographic diffuser 70 comprising a nested matrix of triangular cell subgroups 701.

Figure 5A:
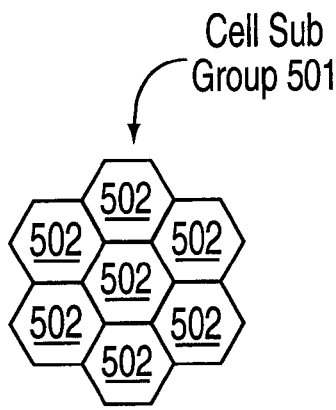
FIG. 5A depicts the nested holographic cells of a cell subgroup of FIG. 5.
Figure 6A:
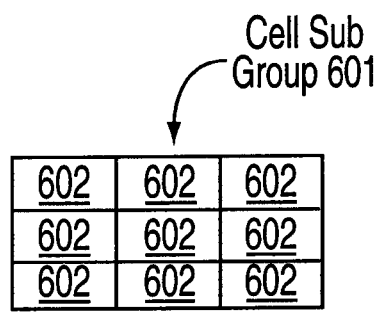
FIG. 6A depicts the nested holographic cells of a cell subgroup of FIG. 6.
Figure 7A:
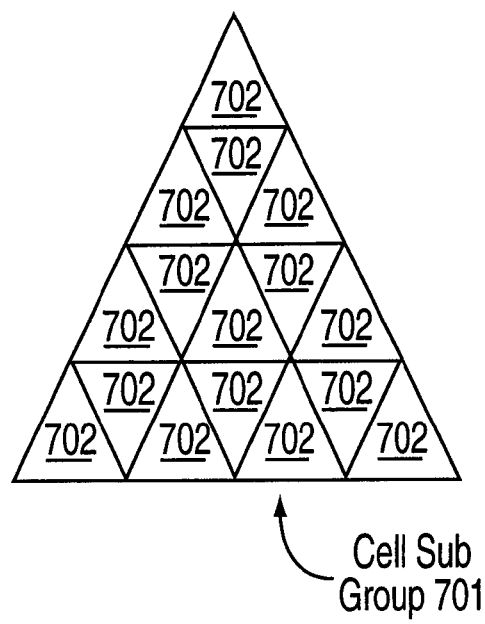
FIG. 7A depicts the nested holographic cells of a cell subgroup of FIG. 7.

Each of these subgroup shapes is filled with a nested matrix of holographic cells. Examples of these are illustrated in FIGS. 5A, 6A, and 7A. FIG. 5A shows how seven nested hexagonal holographic cells 502 can fill cell subgroup 501. FIG. 6A shows how nine nested rectangular holographic cells 602 can fill rectangular cell subgroup 601. FIG. 7A shows how sixteen nested triangular holographic cells 702 can fill triangular cell subgroup 701.

Each different geometric shape has as its own holographic light distribution properties which contribute to the goal of widening the resultant diffused beam in an angularly uniform luminance distribution and with minimum waste outside the angular region of interest to enable the invention.

Nesting of the cell subgroups and of the cells comprising them is advantageous because gaps between subgroups, or between the cells that comprise them, would create void areas having no holographic diffusion properties. Light leakage through said void areas would cause either light losses or unwanted non-uniform display luminance owing to non-uniform diffusion properties.

Figure 1:
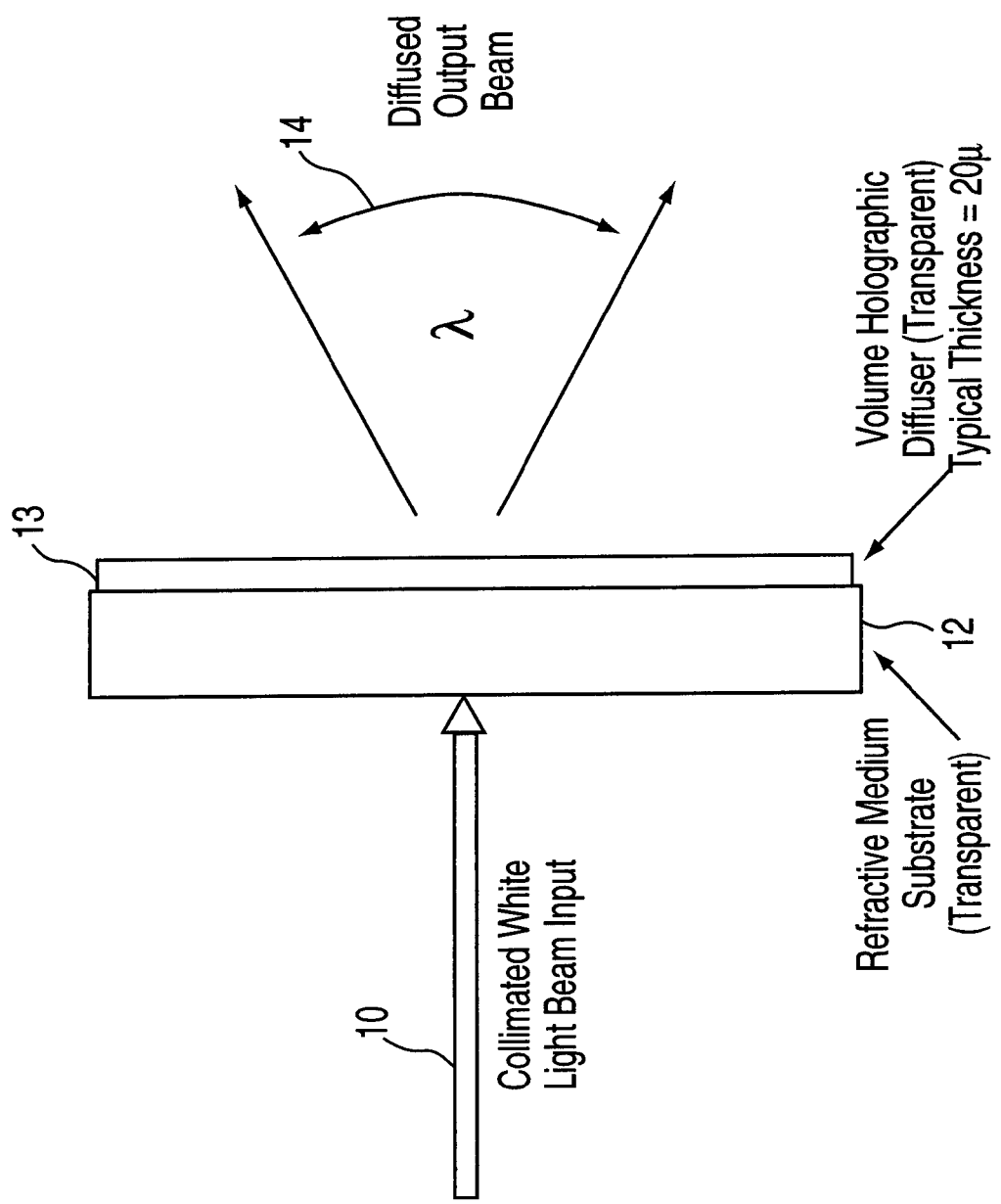
FIG. 1 is a side view of a prior art diffusion screen arrangement.

The holographic properties of cell subgroups and the cells that comprise them differ. The holographic properties of each cell subgroup are identical to those of every other cell subgroup of the holographic diffuser. This ensures identical diffusion characteristics for the composite beam projected from each cell subgroup. The holographic properties of the holographic cells comprising each cell subgroup differ from each other. This is necessary for increasing the prior art diffusion angle 14 defined in FIGS. 1, 1A, and 1B. In addition, as previously described, this is necessary for obtaining luminance uniformity over the design range of viewing angles.

Figure 10:
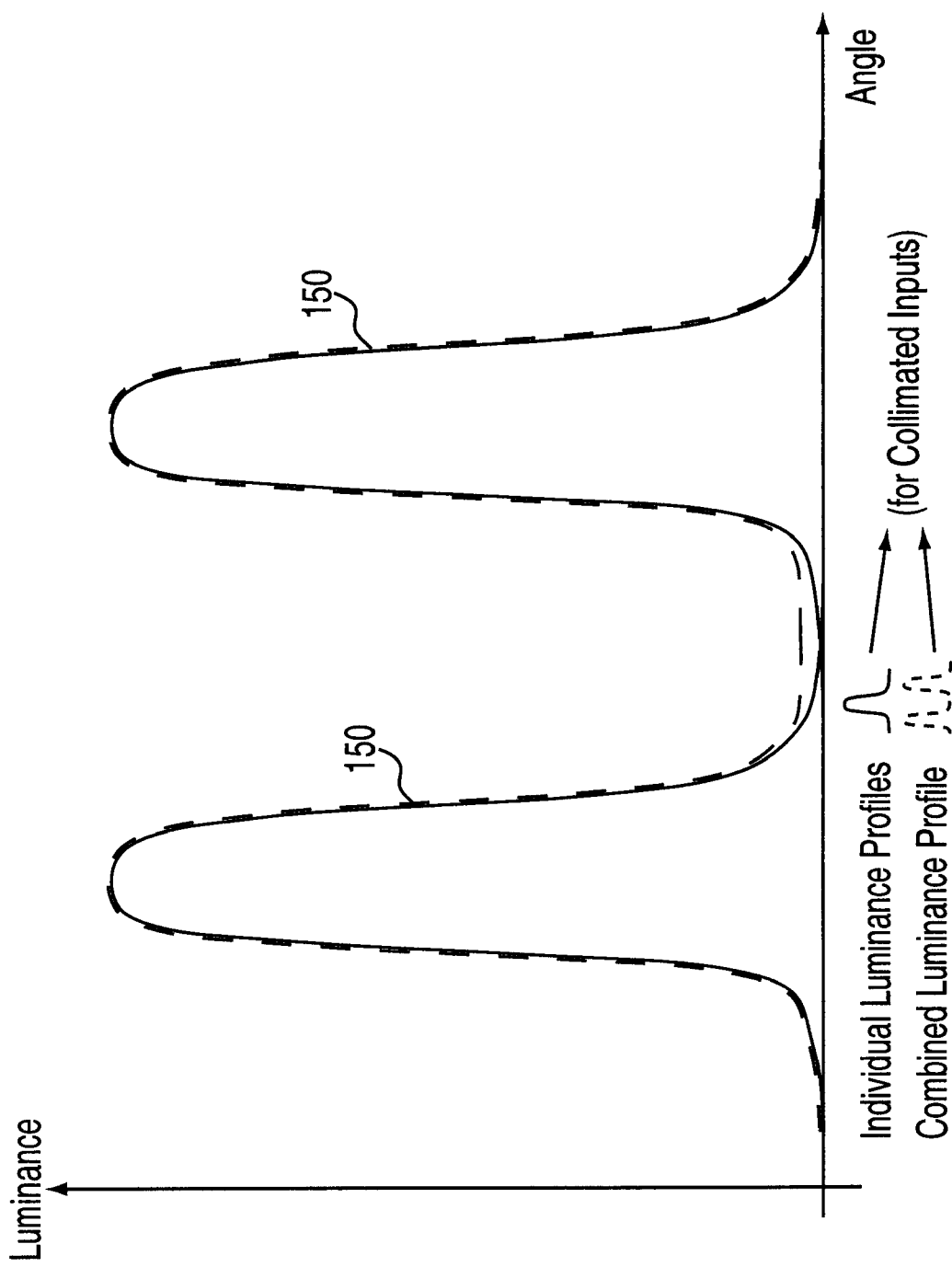
FIG. 10 is a graph in Cartesian coordinates of resultant luminance versus projection angle for two superimposed diffusion profiles of the present invention when collimated light is input to a holographic diffuser.

FIG. 10 is an example of the combined luminance angular profile obtained when collimated light is input for a hologram diffusion screen designed for partially collimated light, such as that for which the luminance angular profile is illustrated in FIG. 9. The distribution cells in FIG. 9 have design angles differing by an amount that causes the two luminance angular profiles cross at a common luminance half peak point. This ensures that the luminance angular distribution profile for the combination, or superposition, of the two luminance distribution profiles projected from the two cells is nearly uniform between the two holographic cell design angles. However, when the two cells are illuminated by more collimated light than that for which their design angles were configured, the resulting distribution profiles 150 illustrated in FIG. 10 will be narrower than those of FIG. 9. Accordingly, the individual luminance profiles 150 of FIG. 10 fail to cross at a common half peak point thereby generating a combined luminance profile with a deep luminance valley between the two luminance profiles 150. The resulting luminance angular non-uniformity in FIG. 10 can be remedied by redesigning the holographic diffuser to have a sufficiently small angular separation between the projection design angles of the two cells to make its two individual luminance profiles cross at a common half peak point. In this way it is possible also to decrease wasted light and to maintain luminance uniformity for collimated, or nearly collimated light input. This will produce uniform display luminance over a larger angular viewing range in comparison to the prior art which fails to use a multiplicity of individually joined geometrically shaped cell subgroups 301 or a superposition of the diffused outputs beams of such cell subgroups.

Specifically, again referring to FIGS. 3 and 4, and as noted above, the present invention creates a holographic diffuser 30 that has a pattern of holographic cell subgroups 301 distributed over the face of the diffuser and/or within the substrate. If the nested adjacent cells within each cell subgroup 301 have different holographic diffuser designs, then a collimated or partially collimated white (or monochrome) light beam input can generate a superposition of two or more diffuser output beam angular distributions (see FIG. 8 and FIG. 9). This is accomplished by generating output diffusion beams in at least two different directions.

Figure 1A:
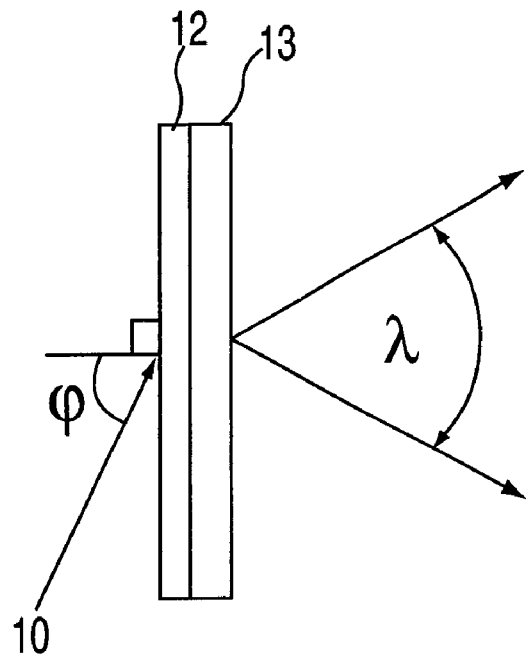
FIG. 1A is a side view of a prior art holographic diffuser wherein the incoming angle incidence of input light is not normal to the face of the holographic diffuser.
Figure 1B:
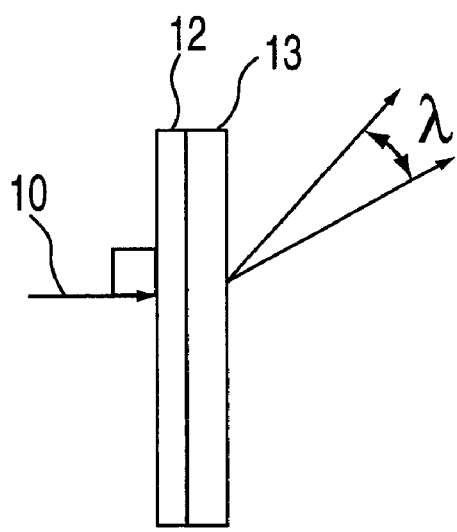
FIG. 1B is a side view of a prior art holographic diffuser wherein the outputted light is not normal to the surface of the holographic diffuser.

The present invention is therefore able to function with both collimated and partially collimated light because each cell produces a superimposed resultant image at viewing location 100 resultant from a sum of diffused beams at projected at different angles. This results in the composite output distribution 83 of FIG. 8 from its components of narrow output distributions 80. This also makes it possible to redirect diffused light beams to fill a viewing angle range of interest when the incident light 5 is normal to the diffuser 30 as shown in FIG. 1B or when it is not normal to the diffuser 30 as shown in FIG. 1A.

It is known in the art that backlighting an LCD display with collimated or partially collimated light considerably improves the contrast of said display. However, the greater the backlight collimation, the more difficult it becomes for current art diffusion screens to illuminate a wide range of viewing angles uniformly and efficiently (without significant wasted light flux). This invention utilizes collimated, or partially collimated, backlighting to enable the simultaneous improvement of display contrast, uniformity, and efficiency over that provided by current art view screens for a wide range of viewing angles.

Thus overall, the invention improves angular uniformity, which is the luminance uniformity of any cell subgroup in the matrix as a function of viewing angle.

A second embodiment of the present invention uses two or more volume holographic diffusers to diffuse passed light that was not diffused in a first pass through a first holographic diffuser as discussed in detail below.

Figure 11:
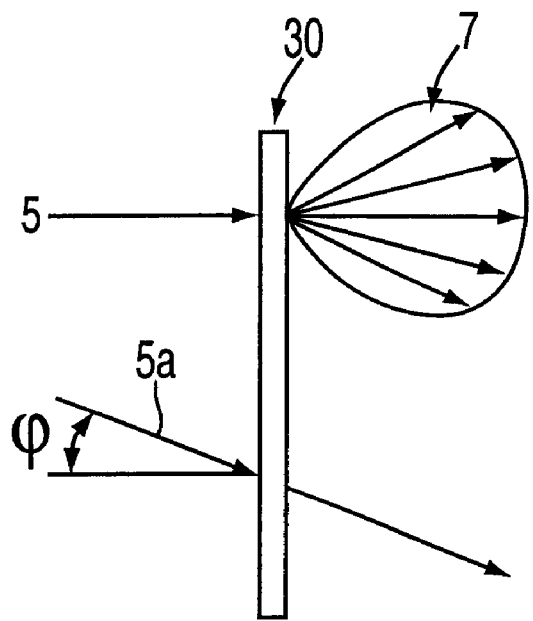
FIG. 11 is a side view of the first element of the second embodiment of the present invention.

Another property of volume holographic diffusers is the tendency to become transparent, i.e., to become non-diffusing transmitters, when the incident beam direction differs sufficiently from its design projection angle. This property is illustrated by FIG. 11. In particular, referring to FIG. 11, incident beam 5 is diffused by the diffuser 30 to create diffused beam 7. Beam 5a is incident at an angle relative to the projection angle, and as discussed above, beam 5a is transmitted without being diffused by the diffuser. It is also noted that input beams 5 and 5a are spatially separated for illustration purposes. The beams should, in practice be superimposed on the same area or across the entire substrate 30.

Figure 12:
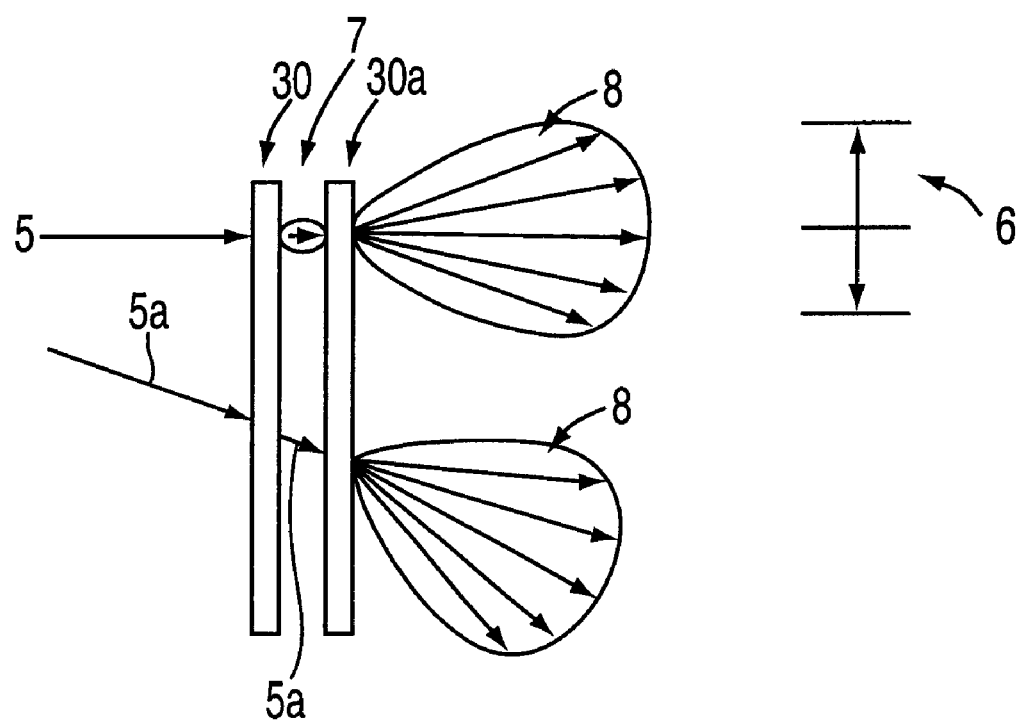
FIG. 12 is a side view of the complete second embodiment with both elements in place.

However, as shown in FIG. 12, in order to eliminate the non-diffuse transmitting property of beam 5a incident at an angle relative to the projection angle, a second volume holographic diffuser 30 can be added to the first. The second added holographic diffuser 30a can be air-spaced from the first holographic diffuser 30. Preferably, it would be laminated to the first holographic diffuser 30. This would inhibit Fresnel reflection losses and, owing to the larger gap between the display and the diffusion screen that would exist with an air gap, resolution losses. The second holographic diffuser 30a would be designed to diffuse the beam 5a that was transmitted non-diffusely by the first holographic diffuser 30. The second holographic diffuser 30a would also transmit most parts of the diffusion profiles due to the first beam 5. The parts of the first beam's diffusion profile, which are closely aligned with the second beam's angle of incidence, would undergo a second stage of diffusion. Also, the designs of both holograms would depend on whether or not the interfaces between them are laminated or air-spaced.

Further, more than two holographic diffuser layers, may be used to accommodate an even larger range of input beams angles to be diffused. Also, the axes of symmetry of the diffusion profiles need not be designed to be parallel to the corresponding input beams.

The present invention is not to be considered limited in scope by the preferred embodiments described in the specification. Additional advantages and modifications will readily occur to those skilled in the art from consideration of the specification and practice of the invention.

What is claimed is:

1. A method of diffusing light for a display comprising the steps of:

sending a group of collimated or partially collimated light beams through a substrate matrix of a plurality of nested individual joined geometrically shaped cells wherein each of the cells contains a patterned volume holographic diffuser with a set projection angle;

producing from each of the cells a transmitted diffused light beam with a narrow angular luminance distribution profile curve with sharply vertical profile slopes at halfpeak points; and superimposing each transmitted diffused light beam from each of the cells to produce a combined resultant diffused light beam having an angular luminance distribution profile curve with sharply vertical profile slopes at halfpeak points and with a substantially flat and wide peak to produce a uniform resultant luminance over a wide range of view angles with a predetermined beam spread and beam deflection angle in relation to a predetermined location of view of the combined resultant diffused light beam.

2. The method of claim 1 wherein the step of sending the group of collimated or partially collimated light beams through a substrate matrix sends each light beam at an angle of incidence which is not normal to an input surface of the substrate matrix of the plurality of nested individual joined geometrically shaped cells.

3. The method of claim 1 wherein the step of superimposing each transmitted diffused light beam from each of the cells to produce a combined resultant diffused light beam produces the combined resultant diffused light beam at an angle of view which is not normal to the input surface of the substrate matrix of cells.

4. The method of claim 1 wherein the nested individual joined geometrically shaped cells are rectangular in shape.

5. The method of claim 1 wherein the nested individual joined geometrically shaped cells are square in shape.

6. The method of claim 1 wherein the nested individual joined geometrically shaped cells are triangular in shape.

7. The method of claim 1 wherein the nested individual joined geometrically shaped cells are hexagonal in shape.

8. The method of claim 1 wherein:

the nested individual joined geometrically shaped cells arc polygonal in shape.

9. The method of claim 1 further comprising the steps of:

providing an additional substrate matrix having patterned individual joined geometrically shaped cells of holographic diffusers with set projection angles structured for forming a combined resultant diffused light beam with an angular luminance distribution profile curve with sharply vertical profile shapes and with a substantially flat and wide peak to produce a uniform resultant luminance over a wide range of view with a predetermined beam spread and beam deflection angle;

locating the additional substrate matrix parallel to said first mentioned substrate matrix; and diffusing non-diffused light from the first mentioned matrix through the additional substrate matrix.

10. A volume holographic diffuser comprising a matrix within a substrate having patterned nested individual joined geometrically shaped cells of holographic diffusers structured for forming a combined superimposed resultant diffused light beam with an angular luminance distribution profile curve with sharply vertical profile shapes and with a substantially flat and wide peak to produce a uniform resultant luminance over a wide range of view with a predetermined beam spread and beam deflection angle in relation to a location of view of the combined resultant diffused light beam.

11. The diffuser of claim 10 wherein said matrix has at least one holographic diffuser which receives and diffuses at east one non-collimated light beam.

12. The diffuser of claim 10 wherein the nested individual joined geometrically shaped cells are polygonal in shape.

13. The diffuser of claim 10 wherein the nested individual joined geometrically shaped cells are square in shape.

14. The diffuser of claim 10 wherein the nested individual joined geometrically shaped cells are triangular in shape.

15. The diffuser of claim 10 wherein the nested individual joined geometrically shaped cells are rectangular in shape.

16. The diffuser of claim 10 wherein the nested individual geometrically shaped cells are hexagonal in shape.

17. The diffuser of claim 10 further comprising an additional matrix having patterned nested individual joined geometrically shaped cells of holographic diffusers structured for forming a combined resultant diffused light beam with an angular luminance distribution profile curve with sharply vertical profile shapes and with a substantially flat and wide peak to produce a uniform resultant luminance over a wide range of view with a predetermined beam spread and beam deflection angle in relation to a location of view of the combined resultant diffused light beam; and said additional matrix being located parallel to said first mentioned matrix and wherein non-diffused light from said first mentioned matrix is diffused by said additional matrix.

18. The volume holographic diffuser of claims 10 wherein said individual joined geometrically shaped cells of holographic diffusers are arranged in nested subgroups.

19. A volume holographic diffuser having individual cells for a display comprising display pixels, said diffuser individual cells being clustered in a contiguous arrangement of nested cell subgroups, the size of each said subgroup being smaller than a display pixel.

20. The volume holographic diffuser of claims 19 wherein said diffuser is directly attached to said display.

* * * * *